Figure 1:
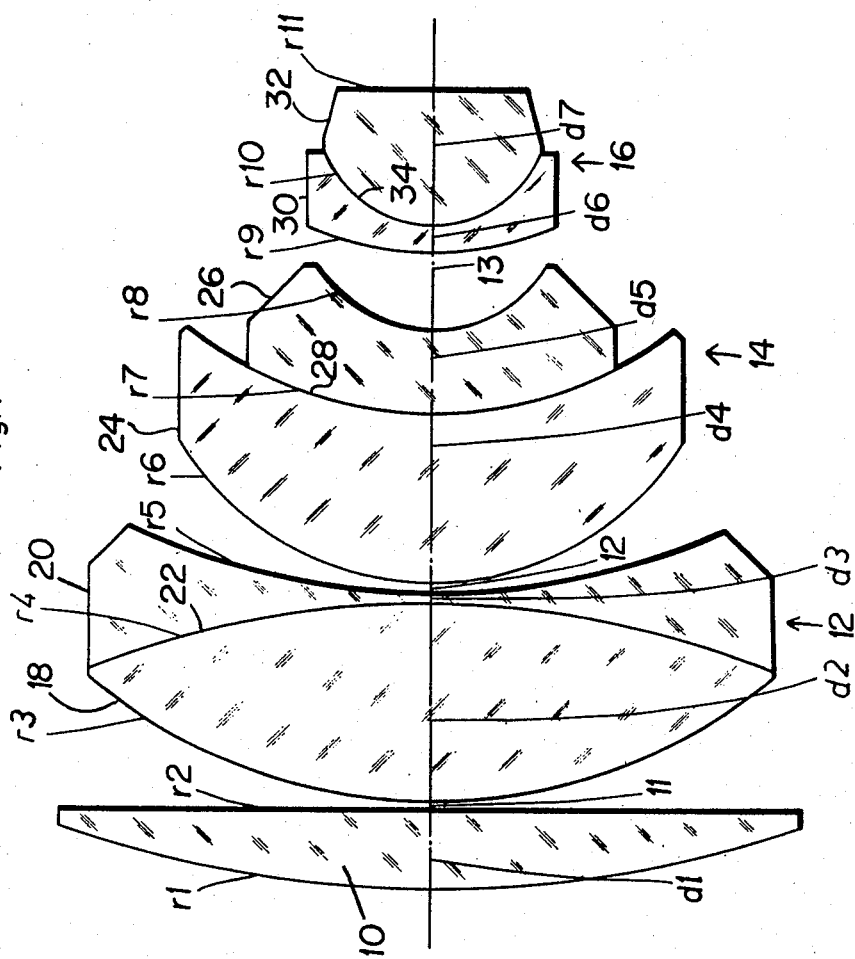
Figure 2:
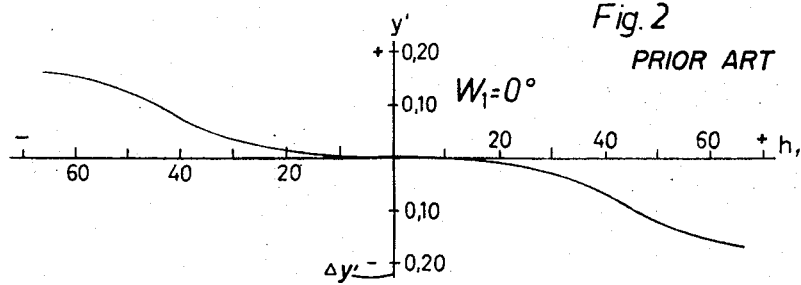
Figure 3:
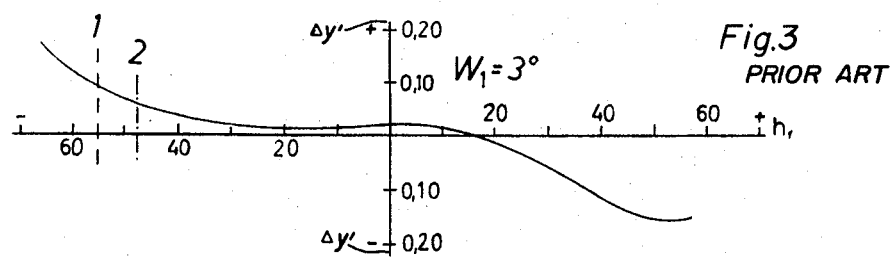
Figure 4:
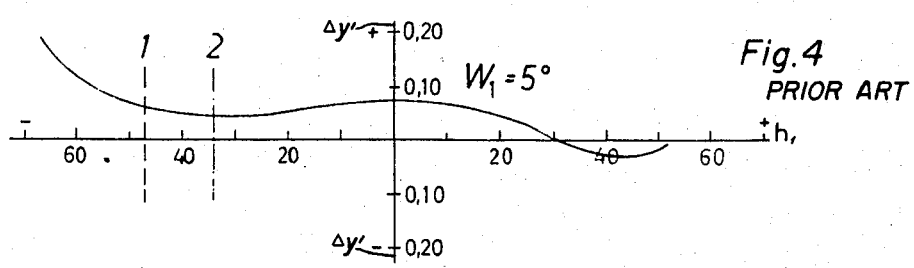
Figure 5:
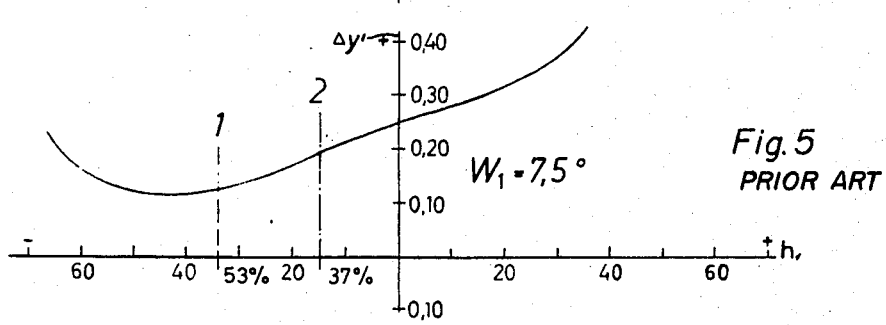
Figure 6:
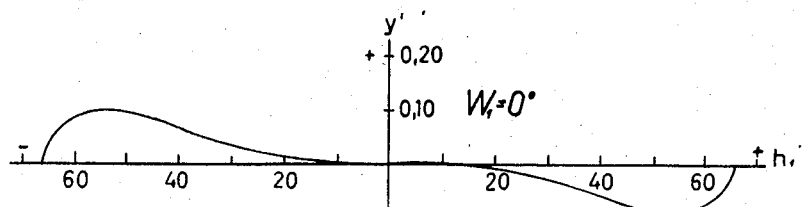
Figure 7:
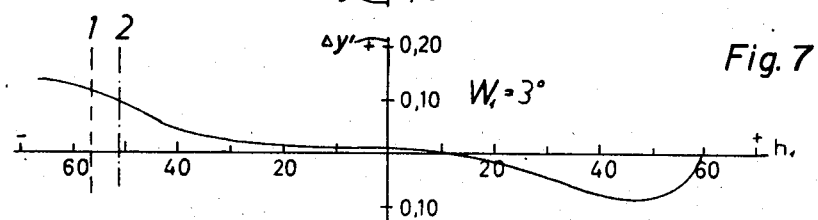
Figure 8:
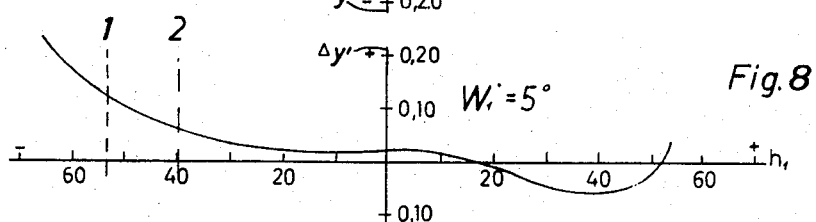
Figure 9:
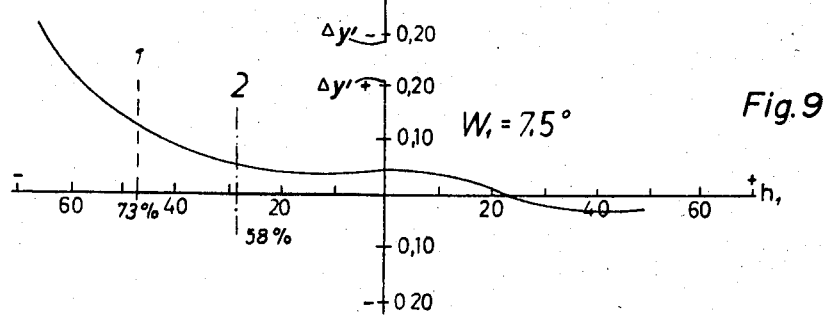

Jan. 24, 1967   KARL-HEINZ PENNIG   3,300,267
HIGH-SPEED PHOTOGRAPHIC LENS SYSTEM
Filed March 20, 1963   3 Sheets-Sheet 1

United States Patent Office 3,300,267
Patented Jan. 24, 1967

3,300,267
HIGH-SPEED PHOTOGRAPHIC LENS SYSTEM
Karl-Heinz Pennig, Munich, Germany, assignor to Optische Werke G. Rodenstock, Munich, Germany
Filed Mar. 20, 1963, Ser. No. 266,601
Claims priority, application Germany, Mar. 28, 1962,
O 8,652
1 Claim. (Cl. 350—223)

This invention relates to a photographic or optical lens system.

It is an object of the invention to provide an improved optical system whose aperture ratio substantially exceeds the value 1:1 and can amount, for example, to about 1/0.75.

The invention relates more particularly to systems which, starting from the long focal intercept (the distance between back lens and image), is composed of a single collective or convergent lens, a cemented collecting meniscus, a scattering meniscus including cemented lens sections, and a cemented collective lens closing the system optically following the short focal intercept, the air space between said collective system and the scattering or diffusion meniscus containing the lens. In such systems, the efficiency can be increased substantially by minor external changes.

It is an object of the invention to provide a system of the above type wherein the focal point is not located in the interior and which does not have a negative focal intercept for distant objects.

A further object is to provide a system which can be used for other than the reduced image of comparatively close articles or objects such as, for example, of X-ray photograph screens.

It is a still further object to provide such systems so that an image on a 1:1 scale is possible.

Yet another object is to provide that the fluorescent screens of image converters can be reproduced in approximately the same size on a light-sensitive film.

It has been found, according to the invention, that certain distributions of refractive powers of the cemented surfaces are unsuitable if a long focal intercept is desired for the lens assembly to enable additional members to be arranged in the space between the last surface of the system and the focal point, these additional members including, for example, a glass plate or slide to press the film into a planar shape or else the glass wall of a cathode-ray tube.

It is proposed, according to the invention, to provide the cemented surface of the collecting meniscus with a relatively strong scattering effect. Taken absolutely, its refractive power should amount to more than 2%, and preferably 3–4% of that of the entire system, and the difference of the refractive indexes of the adjacent glasses therein should be at least 0.06.

The invention proposes, for overcoming comas, that the radius of the cemented surface of the scattering meniscus amount to less than the total focal length, and preferably about 75% of the latter, in which case the refractive power of said surface must amount to more than 5% of the entire system.

Other features and objects of the invention will be found in the following detailed description of a preferred embodiment thereof, as illustrated in the accompanying drawing wherein:

FIGURE 1 is an axial cross-section of a preferred embodiment of the invention;

FIGURES 2–5 consist of coma curves of a system which is to be compared with that of the invention; and FIGURES 6–9 consist of coma curves for the system of the invention.

The optical system illustrated in FIG. 1 comprises generally a single collective lens 10, a collecting meniscus 12, a scattering meniscus 14 and a collective lens or system 16.

The collective lens 10 is a lens having a radius $r_1$ facing the long focal intercept of the system. The other surface of lens 10 which appears to be planar actually has a radius $r_2$.

The collecting meniscus 12 consists of a biconvex member 18 having one surface in face-to-face abutting relationship with the biconcave member 20. The elements 18 and 20 are cemented together along a surface 22 which is a scattering surface as will be discussed in greater detail hereinafter.

The scattering meniscus 14 consists of a convex-concave element 24 in face-to face abutting relationship with a second convex-concave element 26, the two being cemented together along a surface 28 which is a collecting surface.

Finally, the collective lens system 16 consists of a convex-concave element 30 and a further element 32 abutting along a surface 34 which is a collecting surface.

The outermost surface of element 18 is provided with a radius $r_3$, whereas the inner surface thereof is provided with a radius $r_4$, which is also the radius for the inner surface of the element 20, the outer surface of which is provided with a radius $r_5$.

The outer surface of the element 24 is provided with a radius $r_6$, whereas the inner surface of element 24 is provided with a radius $r_7$, which is also the radius for the inner surface of the element 26, the element 26 having its outer surface provided with a radius $r_8$.

The outer surface of the element 30 is provided with a radius $r_9$ and has its inner surface provided with a radius $r_{10}$, which is also the radius for the inner surface of the element 32, the outer surface of which is provided with a radius $r_{11}$.

The lens thicknesses are illustrated by $d_1$–$d_7$ while the air spaces between the lenses are shown by $l_1$–$l_3$.

In accordance with the invention, the preferred embodiment of the invention may be provided with the following dimensions which are given in millimeters:

[Overall focal length=$f$=100 mm.; aperture ratio=1:0.75]

|   |   | Refractive Index/ Abbé Index |
|---|---|---|
| $r_1 = +206.0$ | $d_1 = 14.5$ | 1.6940/54.6 |
| $r_2 = +83.90$ | $l_1 = 0.2$ |  |
| $r_3 = +98.95$ | $d_2 = 36.4$ | 1.6725/44.7 |
| $r_4 = -165.4$ | $d_3 = 2.43$ | 1.7343/28.4 |
| $r_5 = +130.0$ | $l_2 = 0.2$ |  |
| $r_6 = +52.40$ | $d_4 = 30.7$ | 1.6940/54.6 |
| $r_7 = +71.7$ | $d_5 = 14.50$ | 1.7343/28.4 |
| $r_8 = +24.19$ | $l_3 = 13.42$ |  |
| $r_9 = +57.5$ | $d_6 = 5.44$ | 1.6241/36.1 |
| $r_{10} = +21.70$ | $d_7 = 30.0$ | 1.7922/50.2 |
| $r_{11} = \infty$ |  | $s' = 7.12$ for $s = \infty$* |

*Wherein $s'$ is the back focal length and $s$ is the object distance.

For purposes of comparison, the system of the invention will be compared with another system wherein the cemented surface in the collecting meniscus in scattering and has a comparatively small refractive power which, taken absolutely, varies between 1 and 2% of the total refractive power. The cemented surface in the scattering meniscus of said other system, on the other hand, is collecting and has a refractive power which is less than 5% of the total refractive power. The radius of said cemented surface is substantially more than one, and sometimes even more than twice the focal length.

FIGS. 2–5 show the coma curves of a system, the use of which is not considered desirable according to the invention, while FIGS. 6–9 show coma curves for the system according to the invention. In these curves, the height of penetration of the coma rays through the first surface of the system are plotted on the horizontal line for angles W which represent the angle of the parallel incident beam of rays relative to the optical axis, said angles W being 0 degree, 3 degrees, 5 degrees, and 7.5 degrees respectively, while the deviations of the image point height $y'$ of the point of penetration from Gauss' image point are indicated on the vertical line in millimeters for a focal length $f=100$. In FIGS. 2–9 the abscissa $L_1$ represents the height of penetration of the individual rays of the beam from the mid point of the first surface. It will be noted that the coma values in the lens assembly according to the invention are substantially better than in the other systems.

This advantage becomes still more apparent if two identical or even different objectives or lens assemblies for reproducing or photographing at 1:1 are juxtaposed with the lenses facing the long focal intercept. This results in vignetting for the more strongly inclined rays, which thus do not participate in the image. If they are placed closely together, all rays are suppressed, which are on the left of the broken vertical line 1; in the lens assembly according to the invention, these are the rays which show the strongest coma. The overall image is thus free of such gross image defects. The other systems, on the other hand, partly cut off precisely those rays which are comparatively low in defects.

It often happens that the lenses cannot be put in close succession, but have an air space between them which corresponds approximately to the diameter of the beam or bundle of rays or of the front lenses, in order to mount in said space a bending mirror or a prism. In this case, the coma rays are cut off at the dash-and-dot line 2. It will be seen that the vignetting in the other systems is suostantially greater than in the lens assembly according to the invention. Whereas only 37% of the entire cross-section remains free for the image in said other systems, 58% remains free in the system according to the invention, i.e. about ⅗ instead of only about ⅖.

What is claimed is:

A photographic system comprising a single collective lens, a collecting meniscus including two sections joined along a cemented scattering surface and optically following said collective lens, a scattering meniscus including two sections joined along a cemented collecting surface, and a collecting system including two sections joined along a cemented collecting surface, said single collective lens having an outer surface facing the long focal intercept of the system and an inner surface respectively having radii $r_1$ and $r_2$, one of the sections of the collecting meniscus being a bi-convex element having an outer surface facing the collective lens and having a radius $r_3$ and an inner surface having a radius $r_4$, the other section of the collecting meniscus being a bi-concave element having an inner surface with a radius $r_4$ and an outer surface having a radius $r_5$, the scattering meniscus including a convex-concave element having an outer surface facing the collecting meniscus and having a radius $r_6$ and an inner surface having a radius $r_7$ and a second convex-concave element having an inner surface with radius $r_7$ and an outer surface having a radius $r_8$, the collective lens including a convex-concave element having an outer surface facing the scattering meniscus and of a radius $r_9$ and an inner surface of a radius $r_{10}$, the collective lens system including a second element having an inner surface having radius $r_{10}$ and an outer surface having a radius $r_{11}$ and wherein:

[Overall focal length=$f$=100 mm.; aperture ratio=1:0.75]

|  |  | Refractive Index/ Abbé Index |
|---|---|---|
| $r_1 = +206.0$ | $d_1 = 14.5$ | 1.6940/54.6 |
| $r_2 = +83.90$ | $l_1 = 0.2$ |  |
| $r_3 = +98.95$ | $d_2 = 36.4$ | 1.6725/44.7 |
| $r_4 = -165.4$ | $d_3 = 2.43$ | 1.7343/28.4 |
| $r_5 = +130.0$ | $l_2 = 0.2$ |  |
| $r_6 = +52.40$ | $d_4 = 30.7$ | 1.6940/54.6 |
| $r_7 = +71.7$ | $d_5 = 14.50$ | 1.7343/28.4 |
| $r_8 = +24.19$ | $l_3 = 13.42$ |  |
| $r_9 = +57.5$ | $d_6 = 5.44$ | 1.6241/36.1 |
| $r_{10} = +21.70$ | $d_7 = 30.0$ | 1.7922/50.2 |
| $r_{11} = \infty$ |  | $s' = 7.12$ for $s = \infty$ | all dimensions being in millimeters, $s'$ being the back focal length, $s$ the object distance, $d_1$–$d_7$ the axial thicknesses of the lens elements from the front to the rear and $l_1$, $l_2$ and $l_3$ are the air spaces respectively between the collective lens and the collecting meniscus; the collecting meniscus and the scattering meniscus; and the scattering meniscus and the collecting system.

References Cited by the Examiner

UNITED STATES PATENTS 2,978,957  4/1961  Becker et al. _____ 88—57

FOREIGN PATENTS 565,411  11/1944  Great Britain.
696,902  9/1953  Great Britain.

JEWELL H. PEDERSEN, *Primary Examiner.*

R. J. STERN, *Assistant Examiner.*